United States Patent [19]
Shiota

[11] Patent Number: 5,946,325
[45] Date of Patent: Aug. 31, 1999

[54] ATM CELL FORMING DEVICE

[75] Inventor: Yoshiaki Shiota, Tokyo, Japan

[73] Assignee: NEC Corporation, Tokyo, Japan

[21] Appl. No.: 08/866,332

[22] Filed: May 30, 1997

[30] Foreign Application Priority Data

May 31, 1996 [JP] Japan ...................................... 8-138477

[51] Int. Cl.$^6$ .............................. H04J 3/24; H04L 12/28; H04L 12/56
[52] U.S. Cl. ........................................... 370/474; 370/395
[58] Field of Search .................................. 370/395, 470, 370/471, 474, 466

[56] References Cited

U.S. PATENT DOCUMENTS

| | | | |
|---|---|---|---|
| 5,412,655 | 5/1995 | Yamada et al. | 370/60.1 |
| 5,512,915 | 4/1996 | Dieudonne et al. | 370/60.1 |
| 5,541,926 | 7/1996 | Saito et al. | 370/94.2 |
| 5,557,604 | 9/1996 | Usumi et al. | 370/17 |
| 5,768,275 | 6/1998 | Lincoln et al. | 370/419 |
| 5,822,321 | 10/1998 | Petersen et al. | 370/474 |

*Primary Examiner*—Douglas W. Olms
*Assistant Examiner*—David R Vincent
*Attorney, Agent, or Firm*—Sughrue, Mion, Zinn, Macpeak & Seas, PLLC

[57] ABSTRACT

An ATM cell forming device includes a memory, an SAR processing device, and a switch. The memory stores output channel information, cell header information, and frame information to be formed into cells. The SAR processing device assembles frame information into ATM cells by referring to the memory. The switch distributes the cells to the respective output channels. The SAR processing device includes an input frame distributing section, cell header read sections, and a cell assembly section. The input frame distributing section identifies output channels for pieces of frame information by referring to the memory on the basis of pieces of correspondence information, and distributes the pieces of frame information to the respective identified output channels. The cell header read sections are arranged in correspondence with outputs of the input frame distributing section for the respective output channels to read out pieces of cell header information for the respective output channels from the memory and store these pieces of information. The cell assembly section selects one of the cell header read sections, reads out cell header information from the selected section and frame information from the memory, assembles the pieces of information into ATM cells, and outputs them to the switch.

10 Claims, 5 Drawing Sheets

ATM CELL FORMING DEVICE

BACKGROUND OF THE INVENTION

The present invention relates to an ATM cell forming device for an apparatus used on an ATM (Asynchronous Transfer Mode) communication network and, more particular, to an ATM cell forming device designed in consideration of congestion control over an AAL (ATM Adaptation Layer) frame buffer for storing AAL frames to be formed into cells.

A device used for a conventional ATM cell forming circuit to perform cell assembly processing for AAL frames, i.e., SAR (Segmentation and Reassembly) processing has been mainly formed on the assumption that it is used for an ATM cell forming circuit for a terminal apparatus connected to an ATM communication network. For this reason, this device is not based on the concept that ATM cells are output to different channels. Even if, therefore, the device is to be used for an apparatus on the input side of a switch or multiplexer, AAL frames to be formed into cells are stored in a queue buffer regardless of the output channels. The frames are then formed into cells in the order of storage in the queue buffer and output as ATM cells.

FIG. 1 shows an arrangement in which a conventional ATM cell forming circuit is used as a device on the input side of a switch. Referring to FIG. 1, a processor 101 performs a process corresponding to the instructions of software for controlling the overall device, and causes an SAR processing device 104 to perform cell formation processing for AAL frames through a processor bus 102. The ATM cells formed by the SAR processing device 104 are output to a switch 109. A memory 103 is accessed by both the processor 101 and the SAR processing device 104 to form ATM cells. FIG. 2 shows the arrangement of the memory 103.

The arrangement of the memory 103 will be described with reference to FIG. 2. The memory 103 is constituted by a frame cell connection information table 112 in which frame/cell connection information is stored, frame cell formation information 113 containing the header information of each cell, a frame buffer 115 in which information about each frame itself is stored, and a frame descriptor table 114 indicating the address information of each piece of information in the frame buffer 115.

The SAR processing device 104 is constituted by a connection information read section 105 which is connected to the processor 101 through the processor bus 102 and designed to queue the descriptors of frames in a frame descriptor queue 106 in a desired output order by referring to the frame cell connection information table 112 of the memory 103 in accordance with pieces of frame information received from the processor 101, a cell formation information read section 107 for reading out overhead information required for the formation of cells from frames from the frame cell formation information 113 of the memory 103, and an AAL processing section 108 for forming frames into 53-byte ATM cells and outputting them to the switch 109. The AAL processing section 108 has the functions of stopping a cell output operation and discarding a frame and a timer function to control congestion.

The input terminal of the switch 109 is connected to the output terminal of the SAR processing device 104 and designed to output an ATM cell to one of output channels ($C_0$ to $C_n$) 110 in accordance with the output channel address written in the header of the ATM cell output from the SAR processing device 104.

A back pressure signal generating section 111 for notifying congestion upon occurrence of congestion is arranged on the output side of the switch 109. The back pressure signal generating section 111 has the function of outputting a back pressure signal 111a to the AAL processing section 108 of the SAR processing device 104 through the switch 109 upon detection of congestion, the function of discarding cells upon occurrence of congestion, and the function of outputting a back pressure cancel signal to the AAL processing section 108 when congestion is canceled.

The operation of this conventional ATM cell circuit will be described next.

The processor 101 sets connection information in the frame cell connection information table 112 of the memory 103 in advance. When there is frame information to be output to the switch 109, the processor 101 writes the descriptor in the frame descriptor table 114, and the data of the frame itself in the frame buffer 115. Thereafter, the processor 101 transfers the descriptor to the SAR processing device 104.

The transferred descriptor is transferred to the AAL processing section 108 through the connection information read section 105, the frame descriptor queue 106, and the cell formation information read section 107 in the SAR processing device 104.

The AAL processing section 108 reads out 48-byte data as the payloads of ATM cells from the address indicated by the descriptor in the frame buffer 115, assembles the data into 53-byte ATM cells together with 5-byte cell headers, and outputs the cells to the switch 109.

When channel congestion occurs on the output channels for the switch 109, the back pressure signal generating section 111 outputs the back pressure signal 111a to notify the AAL processing section 108 of the occurrence of congestion, and at the same time, discards the transferred cells. At this time, the AAL processing section 108 initializes and restarts the timer. After the cell of the currently output frame are completely output, the AAL processing section 108 stops outputting the next frame.

When the congestion is canceled, the back pressure signal generating section 111 notifies the AAL processing section 108 of the end of congestion. With this operation, the AAL processing section 108 resumes the cell assembly and output operations. If the timer time exceeds a predetermined time before this notification of the end of congestion, the frames queued in the frame descriptor queue 106 are discarded altogether.

When a device used for such a conventional ATM cell forming circuit to perform SAR processing for AAL frames is used for an apparatus on the input side of a switch or multiplexer, even if a specific output channel for the switch or multiplexer undergoes congestion, and the corresponding congestion notification is returned to the SAR processing device, either the congestion notification is neglected or the output operation for all the cells is stopped.

In the method of neglecting the congestion notification, since the degree of congestion in the output channels increases, more cells must be discarded. In the method of stopping the transmission of all cells, even if only a specific output channel is in a congested state, and ATM cells can be output to another output channel which is not in a congested state, since the transmission of all ATM cells is stopped, the frame buffer undergoes congestion. As a result, the overall throughput of the switch decreases.

SUMMARY OF THE INVENTION

It is an object of the present invention to provide an ATM cell forming device which can efficiently be applied to an apparatus on the input side of a switch or multiplexer having different output channels.

In order to achieve the above object, according to the present invention, there is provided an ATM cell forming device comprising memory means for storing output channel information, cell header information for each output channel, and frame information to be formed into cells, ATM cell assembly means for assembling frame information including correspondence information for an access area of the memory means into ATM cells by referring to the memory means, and switch means for distributing the assembled ATM cells to the respective output channels, the ATM cell assembly means including input frame distributing means for identifying output channels for pieces of frame information by referring to the memory means on the basis of pieces of correspondence information included in the pieces of frame information, and distributing and outputting the pieces of frame information to the respective identified output channels, a plurality of cell header read means, arranged in correspondence with outputs of the input frame distributing means for the respective output channels, for reading out pieces of cell header information for the respective output channels from the memory means and storing the pieces of cell header information on the basis of the pieces of frame information output from the input frame distributing means, and cell assembly means for selecting one of the cell header read means, reading out cell header information stored in the selected cell header read means and frame information stored in the memory means, assembling the pieces of information into ATM cells, and outputting the cells to the switch means.

DESCRIPTION OF THE PREFERRED EMBODIMENT

An ATM cell forming circuit according to an embodiment of the present invention will be described in detail next with reference to the accompanying drawings.

Figure 1:
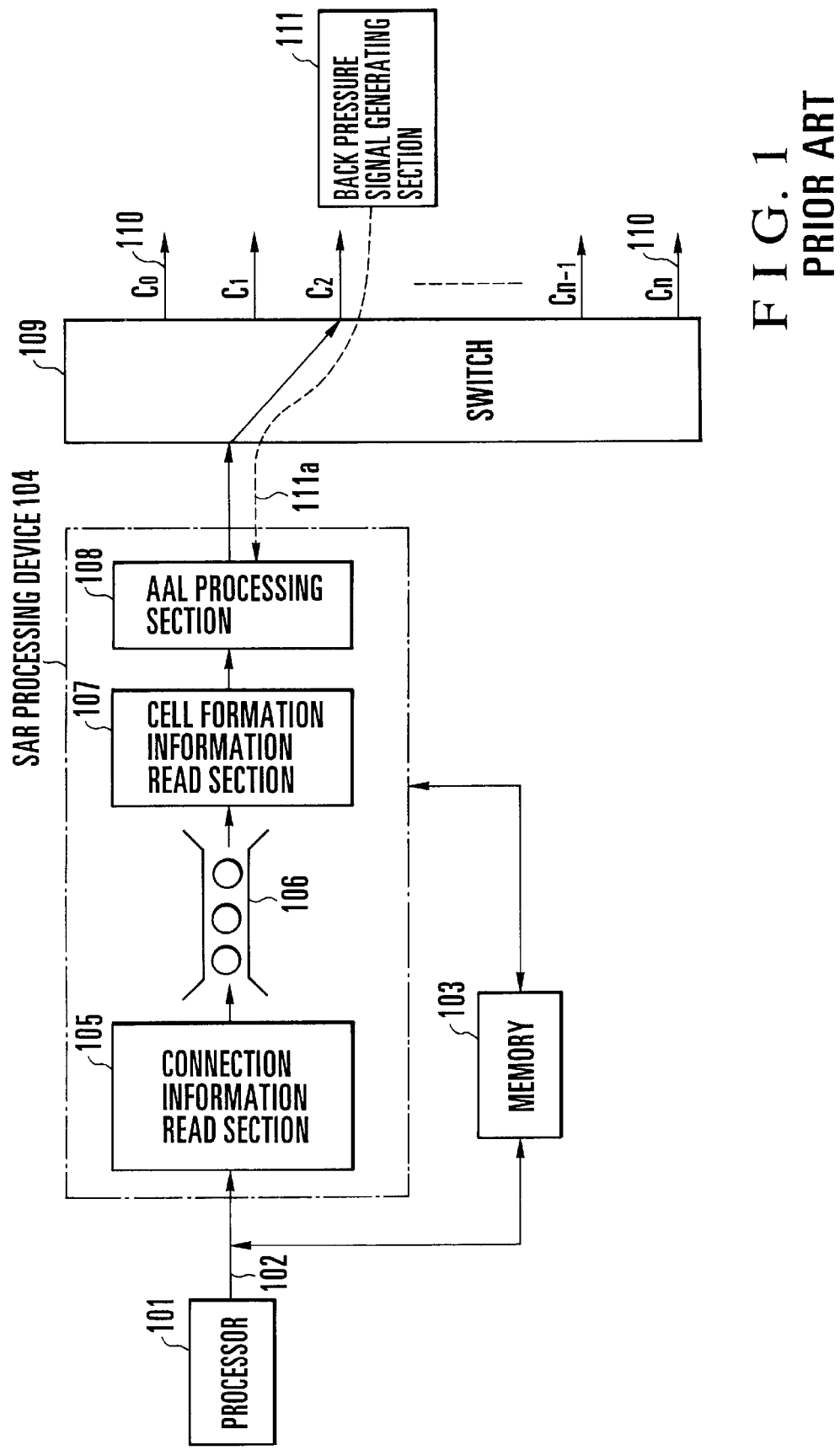
FIG. 1 is a block diagram showing the arrangement of an ATM cell forming circuit including a conventional SAR processing device, together with peripheral circuits.
Figure 2:
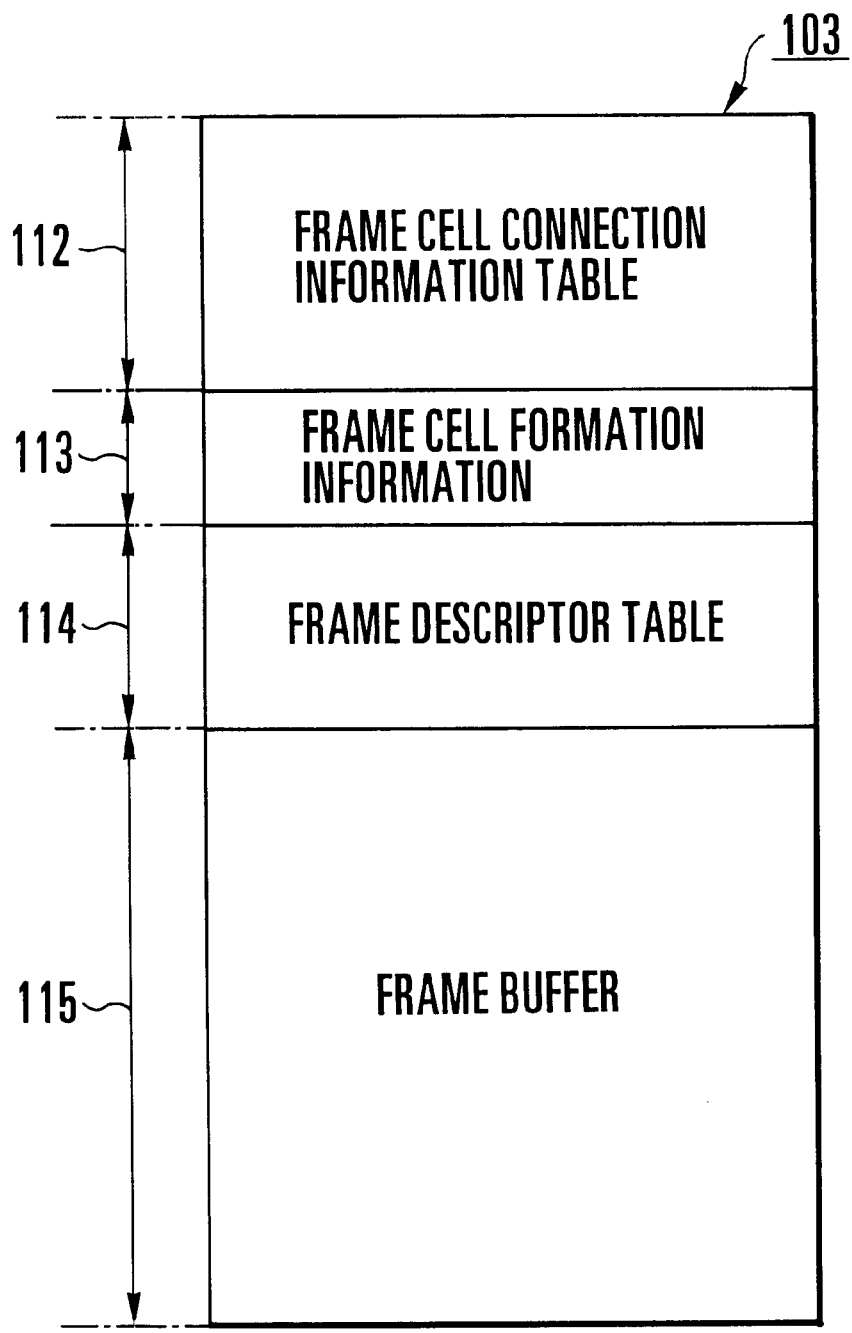
FIG. 2 is a view showing the arrangement of a memory in FIG. 1.
Figure 3:
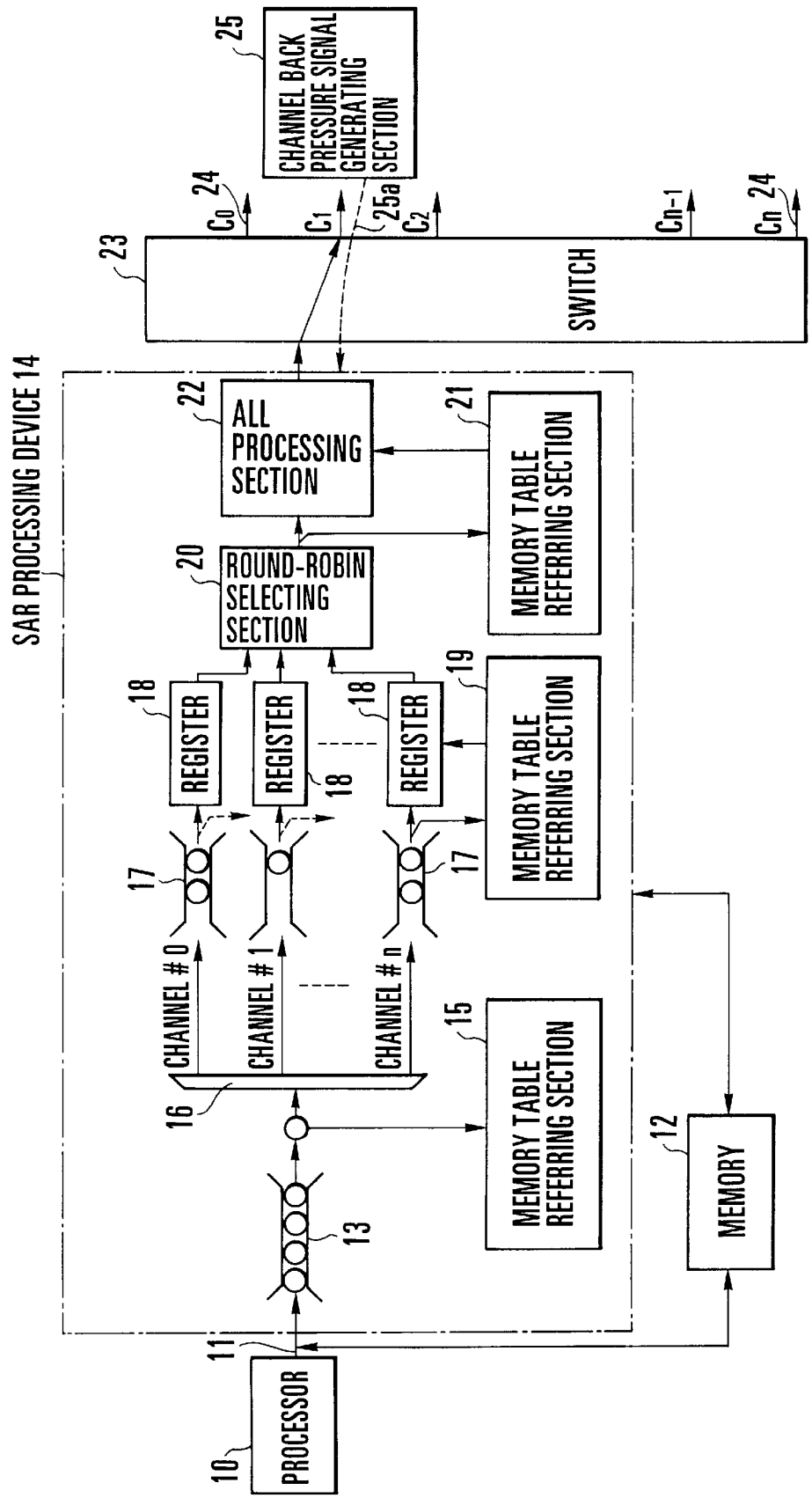
FIG. 3 is a block diagram showing the arrangement of an ATM cell forming circuit including an SAR processing device according to an embodiment of the present invention, together with peripheral circuits.

FIG. 3 shows the arrangement of an ATM cell forming circuit according to the present invention. Referring to FIG. 3, a processor 10 performs processing in accordance with the instructions of software for controlling the overall device, and causes an SAR processing device 14 through a processor bus 11 to perform cell formation processing for AAL frames. The ATM cells formed by the SAR processing device 14 are sent to a switch 23. A memory 12 is accessed by both the processor 10 and the SAR processing device 14 to form ATM cells.

Figure 4:
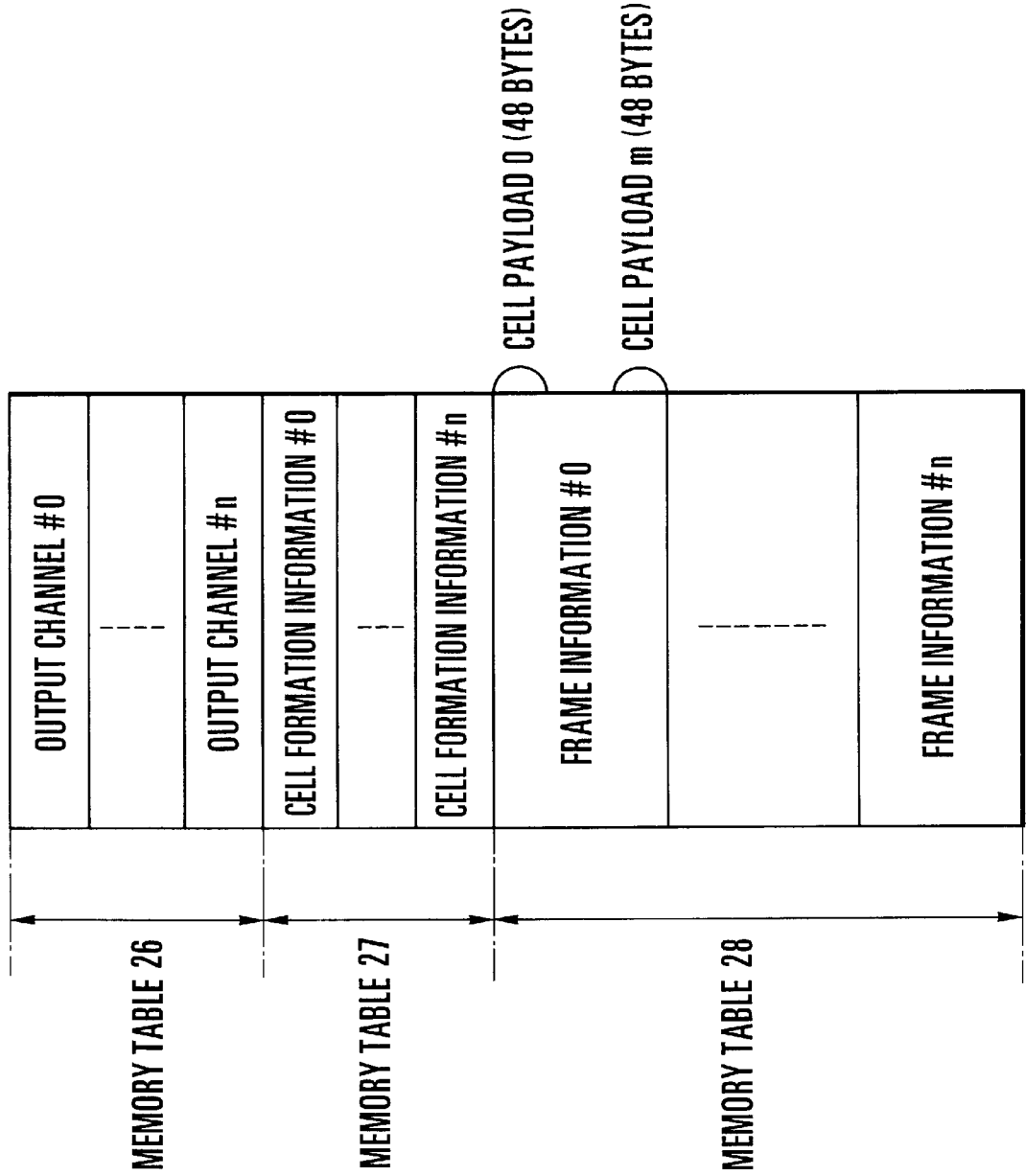
FIG. 4 is a view showing the arrangement of a memory in FIG. 3.

As shown in FIG. 4, the memory 12 is constituted by a memory table 26 in which pieces of frame/cell connection information are written in units of output channels, a memory table 27 in which pieces of information used to form frames into cells are written in units of output channels, and a memory table 28 serving as a frame buffer in which pieces of actual frame information are written in units of output channels. Reference symbol n denotes the number of output channels.

The processor 10 performs processing in accordance with the instructions of software for controlling the overall device, and causes the SAR processing device 14 to perform cell formation processing for AAL frames through the processor bus 11. In this case, the descriptors of AAL frames transferred from the processor 10 are sequentially queued in a frame descriptor queue 13 without any consideration of output channels.

A memory table referring section 15 reads out the AAL frames from the frame descriptor queue 13, and refers to a memory table A of the memory 12 in FIG. 4 to output the frames to a selector 16 upon identifying the output channels to which the readout AAL frames are to be output.

Figure 5:
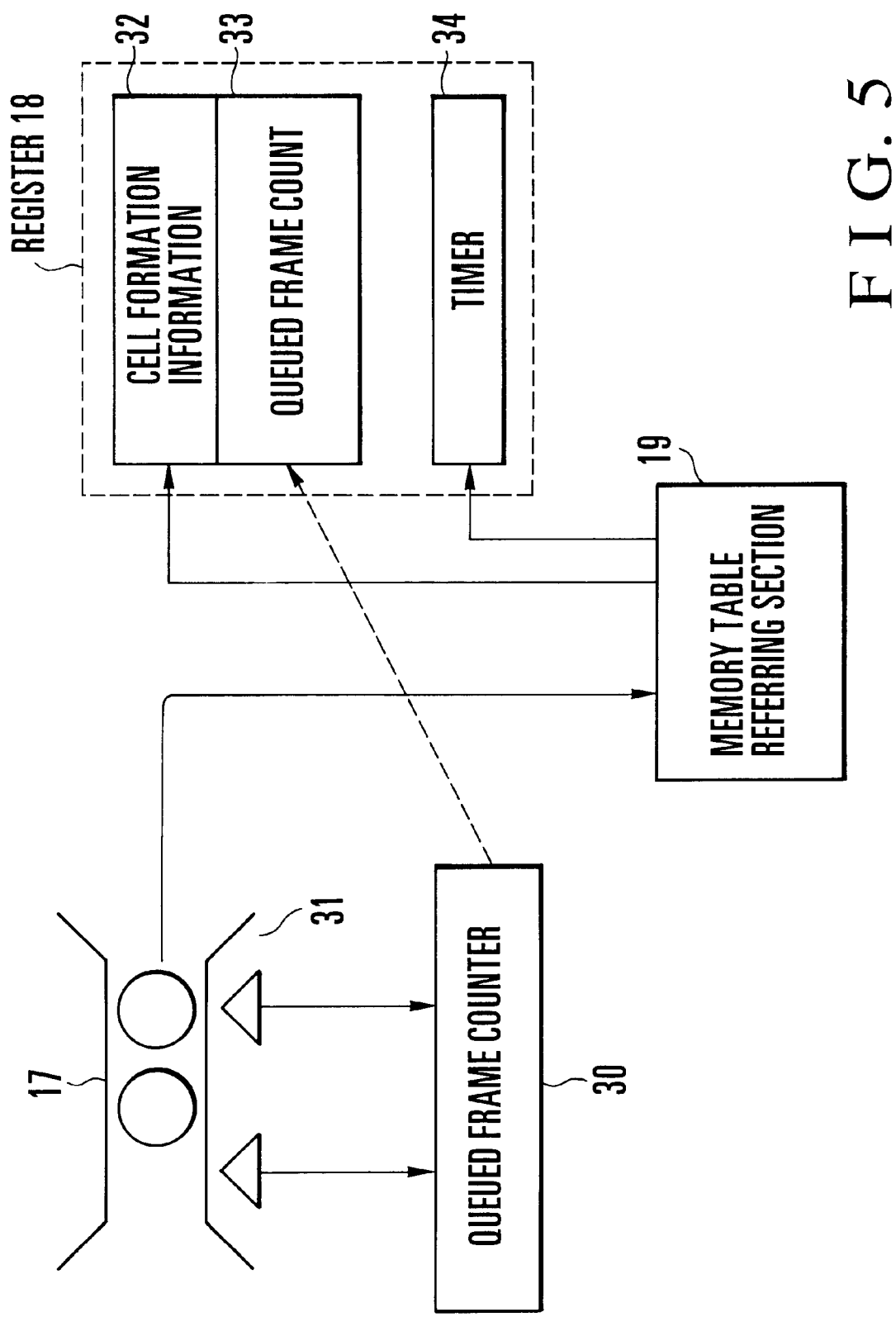
FIG. 5 is a block diagram showing the schematic arrangements of a channel queue and a register in FIG. 3.

The selector 16 separates the readout AAL frames on the basis of the output from the memory table referring section 15. The separated AAL frames are respectively stored in corresponding channel queues 17. As shown in FIG. 5, in each channel queue 17, the input and output of an AAL frame are checked by a read pointer 31 and a write pointer 29. A queued frame counter 30 is incremented by "1" every time an AAL frame is input, and decremented by "1" every time an AAL frame is output, thereby holding the number of AAL frames currently stored in the channel queue, i.e., a queued frame count.

A memory table referring section 19 reads out AAL frames from the channel queues 17, and refers to the memory table 27 of the memory 12 in FIG. 4 to write pieces of cell formation information 32 for the AAL frames in corresponding registers 18 arranged in units of channels. In this case, queued frame counts 33 in the respective channels are also written in the corresponding registers 18 in accordance with pieces of information from the queued frame counters 30 for the channel queues 17. In addition, the timer values of timers 34 arranged in the registers 18 are initialized.

A round-robin selecting section 20 selects AAL frames to be formed into cells, and outputs pieces of information of the AAL frames written in the registers 18. In this case, the AAL frames to be formed into cells include a frame which is not formed into cells at all, and a frame, some bytes (an integer multiple of 48 bytes) of which are formed into a cell. However, the round-robin selecting section 20 performs the above operation without any specific consideration of this. In addition, at this time, AAL frames to be output to an output channel in a congested state are not regarded as choices.

A memory table referring section 21 refers to the memory table 28 of the memory 12 in FIG. 4 on the basis of the pieces of AAL frame information selected and output from the round-robin selecting section 20, and outputs the corresponding pieces of AAL frame information to an AAL processing section 22.

The AAL processing section 22 reads out frame information from the memory table 28 of the memory 12 in units of 48 bytes (cell payloads), adds cell headers to the readout information to assemble ATM cells, and outputs the cells to the switch 23. Upon reception of a congestion notification 25a for each output channel from a channel back pressure signal generating section 25 arranged on the output side, the AAL processing section 22 stops a cell forming operation for a frame at the position of the register 18 in the corresponding channel in units of cells.

The input terminal of the switch 23 is connected to the output terminal of the SAR processing device 14 to output each ATM cell to one of output channels ($C_0$ to $C_n$) 24 in accordance with the output channel address written in the header of the ATM cell output from the SAR processing device 14.

The channel back pressure signal generating sections 25 for notifying congestion upon occurrence of congestion are arranged on the output side of the switch 23. Each channel back pressure signal generating section 25 has the function of outputting the back pressure signal 25a to the SAR processing device 14 through the switch 23 upon detection of congestion. Each channel back pressure signal generating section 25 also has the function of discarding cells upon occurrence of congestion and the function of outputting a back pressure cancel signal to the SAR processing device 14 when congestion is canceled.

The operation of the ATM cell forming circuit having the above arrangement will be described next.

The processor 10 sets output channel information for each AAL frame in the memory table 26 of the memory 12 in advance. When there are frames to be output to the switch 23, the processor 10 writes pieces of frame cell formation information in the memory table 27, writes the data of each frame itself in the memory table 28, and transfers the descriptor of each AAL frame to the SAR processing device 14.

The descriptors transferred to the SAR processing device 14 are temporarily stored in the frame descriptor queue 13. Thereafter, the output channels 24 are determined by the memory table referring section 15, and the descriptors are stored in the channel queues 17 in units of output channels through the selector 16.

The pieces of cell formation information obtained by referring to the memory table 27, the descriptors of the frames, and the queued frame counts in the respective channel queues 17 are transferred to the corresponding registers 18. At the same time, the values of the timers 34 of these registers 18 are initialized.

The round-robin selecting section 20 selects AAL frames to be formed into cells from the registers 18 by a round-robin scheme. In selecting the frames, the round-robin selecting section 20 checks whether the corresponding channels 24 are not in a congested state. If the channels are not in a congested state, the round-robin selecting section 20 transfers the selected AAL frames to the AAL processing section 22 to form them into cells. The pieces of cell information are output to the switch 23. If a given channel is in a congested state, since the congestion notification 25a is sent from the channel back pressure signal generating section 25 arranged for the given channel, the transmission of AAL frames is stopped in the register 18 for the corresponding channel at this time.

In this case, the round-robin selecting section 20 regards the channel 24 corresponding to the congestion notification 25a as a channel not to be selected, and checks the timer value of the timer 34 of the register 18 which has stopped outputting AAL frames. If the timer value exceeds a predetermined time, the pieces of AAL frame information 32 written in the register 18 are discarded. At the same time, the remaining AAL frames are discarded from the channel queue 17 in accordance with the queued frame count 33 written in the register 18. At this time, AAL frames which have arrived at the channel queue after the timer 34 was set are not discarded. In addition, upon reception of a back pressure cancel signal from the channel back pressure signal generating section 25, the switch 23 resumes the transmission of AAL frames to the output channel 24 in which the congestion has been canceled.

As has been described above, according to the ATM cell forming circuit of the present invention, since the congested states of the respective output channels are checked, and frame discarding operations are performed in the respective output channels, frames in channels free from congestion can be properly formed into cells to be output.

In addition, since processing for cells in a channel in a congested state can be stopped in units of cells, wasteful use of the resources for the device can be prevented.

The ATM cell forming circuit of the present invention can therefore be applied to an apparatus on the input side of a switch or multiplexer having different output channels.

What is claimed is:

1. An ATM cell forming device comprising:

memory means for storing output channel information, cell header information for each output channel, and frame information to be formed into cells;

ATM cell assembly means for assembling frame information including correspondence information for an access area of said memory means into ATM cells by referring to said memory means; and switch means for distributing the assembled ATM cells to the respective output channels, said ATM cell assembly means including:

input frame distributing means for identifying output channels for pieces of frame information by referring to said memory means on the basis of pieces of correspondence information included in the pieces of frame information, and distributing and outputting the pieces of frame information to the respective identified output channels;

a plurality of cell header read means, arranged in correspondence with outputs of said input frame distributing means for the respective output channels, for reading out pieces of cell header information for the respective output channels from said memory means and storing the pieces of cell header information on the basis of the pieces of frame information output from said input frame distributing means; and cell assembly means for selecting one of said cell header read means, reading out cell header information stored in said selected cell header read means and frame information stored in said memory means, assembling the pieces of information into ATM cells, and outputting the cells to said switch means.

2. A device according to claim 1, wherein upon reception of congestion information about an output channel, said cell assembly means regards said cell header read means corresponding to the output channel in a congested state as means not be selected.

3. A device according to claim 2, further comprising timer means which is started when cell header information is stored in said cell header read means to count a predetermined time, so that said cell header read means discards the cell header information when the stored cell header information is not read out within the predetermined time counted by said timer means.

4. A device according to claim 1, wherein said memory means comprises:

a first memory area for storing output channel information;

a second memory area for storing cell header information in units of output channels; and a third memory area for storing frame information to be formed into cells.

5. A device according to claim 4, wherein said input frame distributing means comprises:

a queue for sequentially storing pieces of input frame information;

memory referring means for reading out the pieces of frame information from said queue in a chronological order, and identifying output channels for the pieces of frame information by referring to the first memory area of said memory means on the basis of pieces of correspondence information corresponding to an access area of said memory means and contained in the pieces of readout frame information; and selector means for distributing and outputting the pieces of frame information to the respective identified output channels.

6. A device according to claim 4, wherein said cell header read means comprises:

a plurality of queues connected to output terminals of said input frame distributing means for the respective output channels to sequentially store pieces of frame information output from said input frame distributing means in units of output channels;

memory referring means for sequentially reading out pieces of frame information from said queues in a chronological order, and reading out pieces of cell header information corresponding to output channels for the pieces of readout frame information by referring to the second memory area of said memory means; and a plurality of register means arranged in units of output channels in correspondence with said queues to store pieces of readout header information.

7. A device according to claim 4, wherein said cell assembly means comprises:

read selection means for selecting one of said cell header read means and outputting cell header information stored in said selected cell header read means;

memory referring means for reading out frame information by referring to the third memory area of said memory means on the basis of the cell header information output from said read selection means; and cell forming means for assembling the cell header information output from said read selection means and the frame information read out by said memory referring means into ATM cells, and outputting the cells to said switch means.

8. A device according to claim 1, wherein said memory means comprises:

a first memory area for storing pieces of output channel information;

a second memory area for storing pieces of cell header information in units of output channels; and a third memory area for storing pieces of frame information to be formed into cells, said input frame distributing means comprises:

a first queue for sequentially storing pieces of input frame information;

first memory referring means for sequentially reading out the pieces of frame information from said first queue in a chronological order, and identifying output channels for the pieces of frame information by referring to the first memory area of said memory means on the basis of pieces of correspondence information corresponding to an access area of said memory means and contained in the pieces of readout frame information; and selector means for distributing and outputting the pieces of frame information to the respective identified output channels, said cell header read means comprises:

a plurality of second queues connected to output terminals of said selector means for the respective output channels to sequentially store pieces of frame information output from said selector means in units of output channels;

memory referring means for reading out the pieces of frame information from said second queues in a chronological order, and reading out pieces of cell header information corresponding to output channels for the pieces of readout frame information by referring to the second memory area of said memory means; and a plurality of register means arranged in units of output channels in correspondence with said second queues to store pieces of readout cell header information, and said cell assembly means comprises:

register selection means for selecting one of said register means and outputting cell header information stored in said selected register means;

third memory referring means for reading out frame information by referring to the third memory area of said memory means on the basis of cell header information output from said register selection means; and cell forming means for assembling the cell header information output from said register selection means and the frame information read out by said memory referring means into ATM cells, and outputting the cells to said switch means.

9. A device according to claim 8, further comprising a plurality of congestion notifying means for outputting congestion notification in units of output channels to indicate that the output channels are in a congested state, so that upon reception of a congestion notification from said congestion notifying means, said register selection means regards said register means corresponding to the output channel in a congested state as means not be selected.

10. A device according to claim 9, wherein said register means comprises timer means for counting a predetermined time, said second memory referring means stores the number of frames queued in said second queue in said register means and starts said timer means at the same time when cell headers of pieces of frame information read out from said second queue are stored in said register means, and said register selection means discards the pieces of frame information stored in said register means when a timer value of said timer means exceeds a predetermined time, and discards the pieces of frame information queued in said second queue by the number of queued frames.

* * * * *